United States Patent
Gadagottu

(10) Patent No.: US 7,333,509 B1
(45) Date of Patent: Feb. 19, 2008

(54) CELL RELAY USING THE INTERNET PROTOCOL

(75) Inventor: Ramana Gadagottu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1108 days.

(21) Appl. No.: 10/108,324

(22) Filed: Mar. 26, 2002

(51) Int. Cl.
H04J 3/22 (2006.01)

(52) U.S. Cl. .................... 370/467; 370/465; 370/466

(58) Field of Classification Search ............. 370/254, 370/255, 389, 393, 395.1, 395.21, 397, 395.3, 370/396, 396.31, 399, 395.5, 400, 395.51, 370/395.6, 395.54, 465–473; 709/238–244; 711/221
See application file for complete search history.

(56) References Cited

U.S. PATENT DOCUMENTS

| | | |
|---|---|---|
| 6,618,397 B1 | 9/2003 | Huang |
| 6,680,943 B1 * | 1/2004 | Gibson et al. ............ 370/392 |
| 6,757,298 B1 | 6/2004 | Burns et al. |
| 6,778,494 B1 * | 8/2004 | Mauger ................... 370/230 |
| 6,778,531 B1 * | 8/2004 | Kodialam et al. ......... 370/390 |
| 6,798,785 B1 | 9/2004 | Sasson et al. |
| 6,842,454 B2 | 1/2005 | Metcalf, III |
| 6,882,643 B1 * | 4/2005 | Mauger et al. ........... 370/389 |
| 6,885,677 B1 * | 4/2005 | Klevans ................... 370/466 |
| 6,963,561 B1 | 11/2005 | Lahat |
| 7,027,450 B2 | 4/2006 | Collette et al. |
| 7,031,312 B1 * | 4/2006 | Jayakumar et al. ........ 370/392 |
| 7,197,033 B2 * | 3/2007 | Reeves et al. ............. 370/389 |
| 2003/0118047 A1 | 6/2003 | Collette et al. |
| 2003/0204617 A1 | 10/2003 | Buchsbaum et al. |
| 2006/0034328 A1 | 2/2006 | Aldermeshian et al. |

OTHER PUBLICATIONS

"A Comparative Overview of Frame Relay and ATM" Sprint Technical Report, Jun. 2001.
"Understanding the Big ATM Picture" Kristin King, Oct. 19, 2001.
"Real-World ATM" Kristin King, Oct. 19, 2001.
U.S. Appl. No. 10/369,054, entitled "Network Relay Protocol Having Timed Packet Aggregation," filed Feb. 14, 2003, Stu Grossman.

* cited by examiner

Primary Examiner—Wing Chan
Assistant Examiner—Mark A. Mais
(74) Attorney, Agent, or Firm—Shumaker & Sieffert P.A.

(57) ABSTRACT

In general, the invention provides for the relaying of ATM cells through an IP network. In one embodiment, an apparatus, such as a routing device, comprises a first interface card for coupling to an asynchronous transfer mode (ATM) network, and a second interface card for coupling to an Internet Protocol (IP) network. The apparatus further comprises a control unit to assign labels to inbound cells from the ATM network to form outbound Multiprotocol Label Switching (MPLS) packets for forwarding to the IP network, and to remove labels from inbound MPLS packets from the IP network to form outbound cells for forwarding to the ATM network. The apparatus can encapsulate the ATM cells within MPLS packets, and route the MPLS packets through the IP network without regard to the content of the ATM cells. In this manner, the routers may relay ATM cells of any type, including data and control cells.

39 Claims, 9 Drawing Sheets

VIRTUAL CIRCUIT DATA

| 1.48 | ID1 |
|---|---|
| 2.15 | ID2 |
| 2.16 | ID2 |
| 2.17 | ID2 |

FIG. 8

VIRTUAL CIRCUIT DATA

| 1.0 | ID1 |
|---|---|
| 1.1 | ID1 |
| 1.2 | ID1 |
| 1.511 | ID1 |
| 2.1 | ID1 |
| 2.255 | ID1 |

FIG. 9

CELL RELAY USING THE INTERNET PROTOCOL

TECHNICAL FIELD

The invention relates to computer networks and, more particularly, to techniques for routing packets within computer networks.

BACKGROUND

In recent years, Asynchronous Transfer Mode (ATM) has become a relatively popular network technology in which information is transferred in small cells having a fixed size. To transfer the cells, ATM switches within a network create a fixed path, referred to as an ATM virtual circuit. The cells transmitted by a source device within the ATM network travel along the virtual circuit created by the ATM switches. A destination device receives the cells from the virtual circuit, and reassembles the information from the cells. The small, constant cell and fixed path allow ATM equipment to readily allocate and manage the bandwidth required to transmit video, audio, and computer data over the same ATM network.

Another popular network technology is the Internet Protocol (IP) networking protocol in which information is divided into blocks called packets. In contrast to ATM, these packets, also referred to as datagrams, may vary in size, and are individually routed across the network from a source device to a destination device. In other words, unlike the virtual circuits within an ATM network, each packet can take a different route from the source to the destination device within the IP network. The destination device extracts the information from the packets and assembles the information into its original form.

SUMMARY

In general, the invention provides for the relaying of ATM cells through an IP network. In one embodiment, an apparatus, such as a routing device, comprises a first interface card for coupling to an asynchronous transfer mode (ATM) network, and a second interface card for coupling to an Internet Protocol (IP) network. The apparatus further comprises a control unit to assign labels to inbound cells from the ATM network to form outbound Multiprotocol Label Switching (MPLS) packets for forwarding to the IP network, and to remove labels from inbound MPLS packets from the IP network to form outbound cells for forwarding to the ATM network.

In one embodiment, a method comprises receiving cells of a fixed length, such as ATM cells, and assigning labels to the cells to form Multiprotocol Label Switching (MPLS) packets. The method further comprises routing the MPLS packets through Labeled Switch Paths (LSPs) in accordance with the labels.

In another embodiment, a method comprises generating mapping data that maps virtual circuits to one or more labels for Labeled Switch Paths (LSPs), receiving a cell from one of the virtual circuits, and identifying the virtual circuit from which the cell was received. The method further comprises selecting one of the labels for the cell based on the mapping data and the identified virtual circuit, assigning the selected label to the cell to form a Multiprotocol Label Switching (MPLS) packet, and routing the MPLS packet in accordance with the label.

In another embodiment, an apparatus comprises an interface card to receive cells of a fixed length, and a control unit to assign labels to the cells to form Multiprotocol Label Switching (MPLS) packets, and to route the MPLS packets through Labeled Switch Paths (LSPs) in accordance with the labels.

In another embodiment, a computer-readable medium comprises instructions that cause a programmable processor to receive cells, assign labels to the cells to form Multiprotocol Label Switching (MPLS) packets, and route the MPLS packets through Labeled Switch Paths (LSPs) in accordance with the labels.

In another embodiment, a computer-readable medium comprises computer-readable media to store data that maps virtual circuits of an ATM network to the Labeled Switch Paths (LSPs) of an IP network. The data may comprise virtual circuit (VC) data that maps the virtual circuits to unique identifiers, and routing data that maps the unique identifiers to the Labeled Switch Paths (LSPs).

The invention may provide one or more advantages. For example, a number of ATM networks may be readily interconnected using an IP network, such as the Internet. Routers coupled to the ATM can route the MPLS packets through the IP network without regard to the content of the ATM cells. In this manner, the routers may relay ATM cells of any type, including data and control cells. Furthermore, routers need not disassemble or reassemble the information carried by the cells.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 8 illustrates an example embodiment in which a control unit of the router has generated virtual circuit data in response to configuration input that specifies a combination of an independent virtual circuit and a virtual path.

FIG. 9 illustrates an example embodiment in which the control unit has generated virtual circuit data in response to configuration input specifying that all virtual circuits of a port be mapped to a common identifier.

DETAILED DESCRIPTION

Figure 1:
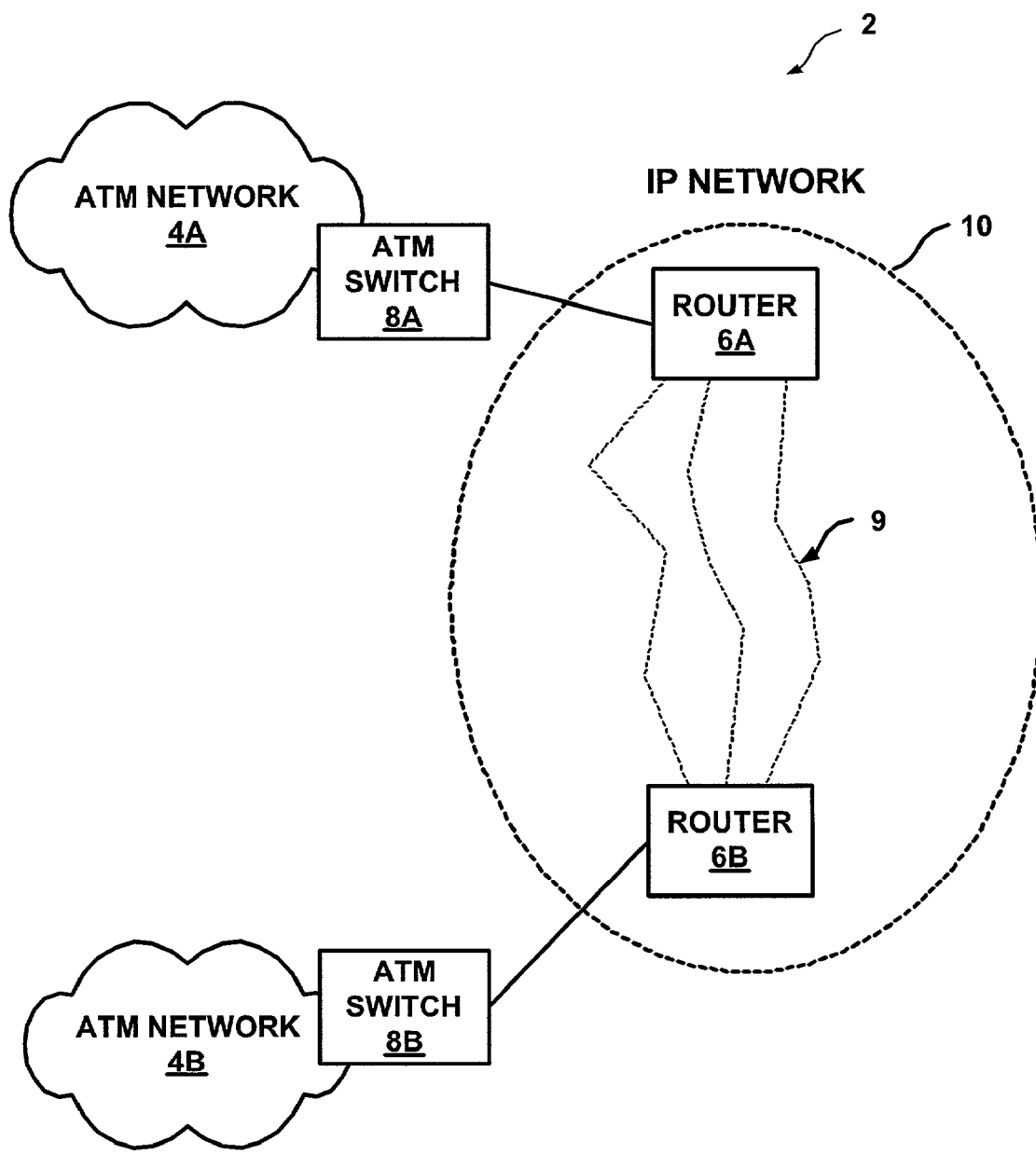
FIG. 1 is a block diagram illustrating an example system in which a number of asynchronous transfer mode (ATM) networks are communicatively coupled via an Internet Protocol (IP) network in accordance with the principles of the invention.

FIG. 1 is a block diagram illustrating an example system 2 in which a number of asynchronous transfer mode (ATM) networks 4A-4B (herein ATM networks 4) are communicatively coupled via an Internet Protocol (IP) network 10 in accordance with the principles of the invention.

ATM networks 4 represent conventional ATM networks that communicate information in constant-length cells via ATM virtual circuits. ATM switches 8A-8B (herein ATM switches 8) couple ATM networks 4 to routers 6A-6B (herein routers 6) of IP network 10. In general, routers 6 receive cells from ATM switches 8, and relay the individual cells through IP network 10. In this manner, devices within ATM networks 4 may transparently communicate cells across IP network 10.

More specifically, routers 6 construct label switch paths (LSPs) 9 within IP network 10 in accordance with the Multiprotocol Label Switching (MPLS) protocol. Upon receiving cells from ATM switches 8, routers 6 forward the cells as individual MPLS packets through LPSs 9. To configure LSPs 9 within IP network 10, routers 6 may issue control messages specifying a sequence of hops within IP network 10 for each LSP 9. The control messages flow through IP network 10, and communicate the necessary label-forwarding information to the internal routers.

Routers 6 include ATM interface cards configured to communicate cells via virtual circuits. As described in detail below, routers 6 map the virtual circuits to LSPs 9. Upon receiving inbound cells from ATM switches 8, routers assign labels to the cells based on the mapping to form MPLS packets. Routers 6 route the MPLS packets through IP network 10 in accordance with the labels, and without regard to the content of the ATM cells. In this manner, routers 6 may relay ATM cells of any type, including data and control cells. Routers 6 need not disassemble or reassemble the information carried by the cells.

Figure 2:
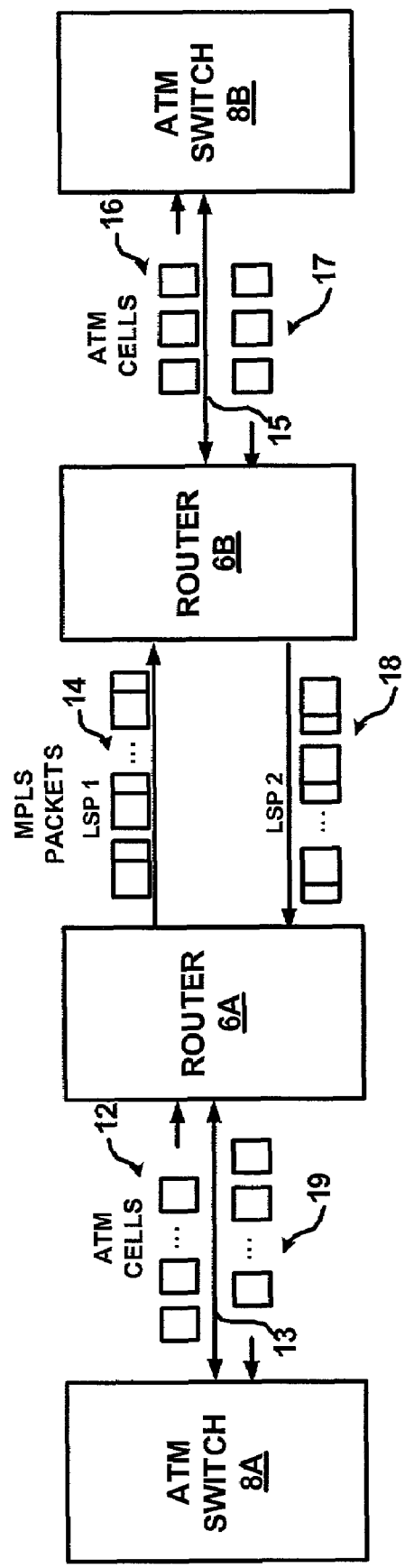
FIG. 2 is a block diagram illustrating a process of relaying ATM cells through the IP network.

FIG. 2 is a block diagram further illustrating the process of relaying ATM cells through IP network 10 as MPLS packets. ATM switch 8A outputs ATM cells 12 on virtual circuit 13. Router 6A receives inbound ATM cells 12, and assigns a common MPLS label to each cell to form outbound MPLS packets 14. Router 6A may, for example, pre-pend the MPLS label to each of inbound cells 12 without regard to the content of the cells. Router 6A forwards outbound MPLS packets 14 to router 6B via label switch path 1 (LSP1). Because each of outbound MPLS packets 14 carries a common label, each packet flows down the same label switch path, i.e., LSP1.

Upon receiving inbound MPLS packets 14, router 6B removes the MPLS labels to produce outbound ATM cells 16 in their original form. Router 6B forwards outbound ATM cells 16 to ATM switch 8B via virtual circuit 15.

Communications in the other direction flow in a similar manner. Namely, ATM switch 8B outputs ATM cells 17 on virtual circuit 15. Router 6B receives inbound ATM cells 17 from virtual circuit 15, and assigns a common MPLS label to each cell to form outbound MPLS packets 18. Router 6B forwards outbound MPLS packets 18 to router 6A via label switch path (LSP2). Finally, router 6A removes the MPLS labels of inbound MPLS packets 18 to produce outbound ATM cells 16 for forwarding to ATM switch 8A via virtual circuit 13.

Figure 3:
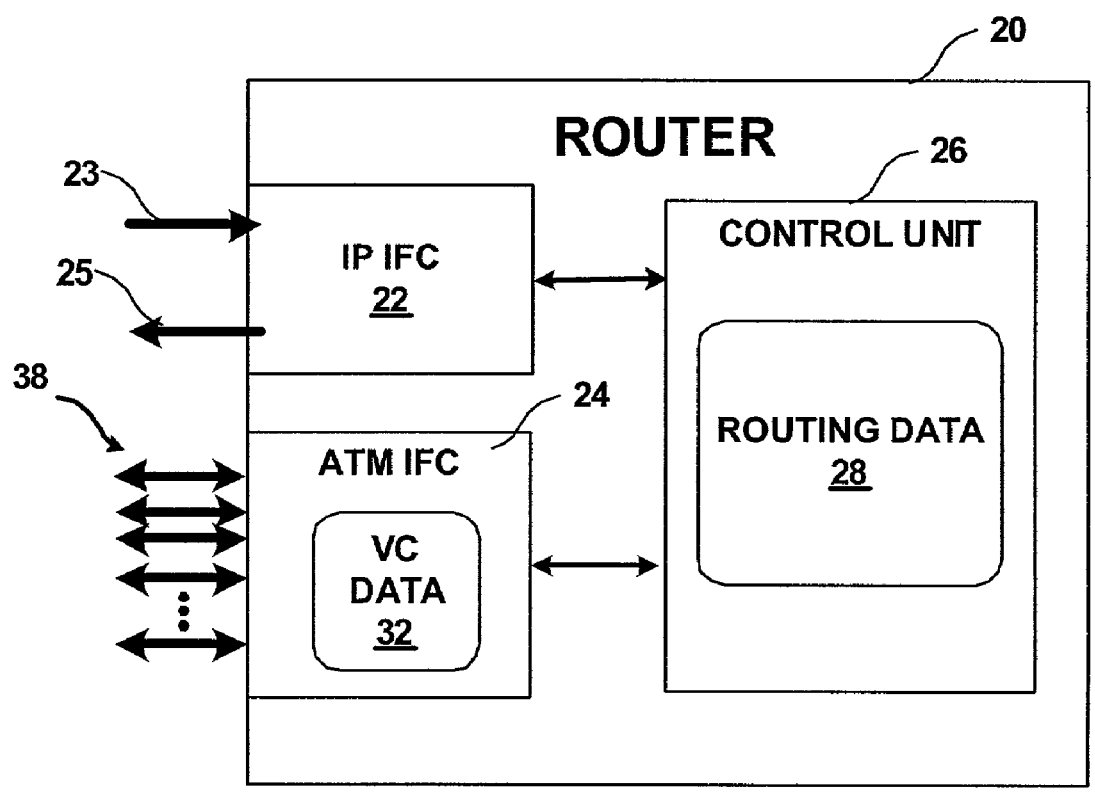
FIG. 3 is a block diagram of an example embodiment of a router that relays ATM cells through an IP network consistent with the principles of the invention.

FIG. 3 is a block diagram of an example embodiment of a router 20 that relays ATM cells through an IP network consistent with the principles of the invention. In the exemplary embodiment illustrated in FIG. 1, router 20 includes at least one interface card (IFC) 22 for communicating packets, including MPLS packets, between the router and the IP network via network link 23 and 25. IFC 22 is typically coupled to network link 23, 25 via a number of interface ports. In addition, router 20 includes at least one ATM interface card (ATM IFC) 24 for communicating ATM cells between the router and an ATM network via virtual circuits 38.

Router 20 includes a control unit 26 that maintains routing data 28, which describes a topology of the IP network. In particular, routing data 28 describes various routes within the network, and the appropriate next hop for each route, i.e., the neighboring devices of router 20 within the IP network along each of the routes. Routing data 28 associates the next hops with the interfaces ports of IFC 22 that couple router 20 to network link 23. In this manner, routing data 28 may map LSPs within the IP network to particular interface ports of IFC 22.

In addition, control unit 26 generates virtual circuit (VC) data 32 that, in conjunction with routing data 28, maps virtual circuits 38 to the LSPs. Control unit 26 may, for example, generate VC data 32 to map virtual circuits 38 to a set of unique identifiers that correspond to entries within routing data 28. In this manner, VC data 32 and routing data 28 map virtual circuits 38 to corresponding LSPs within the IP network. Control unit 26 may generate the mapping in response to input received from a system administrator or user, and communicates VC data 32 to ATM IFC 24 for application to inbound ATM cells received from virtual circuits 38.

In general, router 20 relays ATM cells through the IP network by forming an independent MPLS packet from each cell based on routing data 28 and VC data 32, and forwarding the MPLS packets through the IP network via LSPs. More specifically, ATM IFC 24 receives inbound cells from virtual circuits 38, and selectively retrieves a unique identifier from VC data 32 for each cell based on the virtual circuit from which the cell arrived. ATM IFC 24 forwards the cells and the respective unique identifiers to control unit 26.

Control unit 26 assigns each inbound cell an appropriate MPLS label from routing data 28 based on the respective unique identifier, and forms outbound MPLS packets by pre-pending the MPLS labels to the respective ATM cells. In accordance with routing data 28, control unit 26 forwards the MPLS packets on the IP network via network link 25. In the reverse direction, IFC 22 receives MPLS packets from network link 23, and communicates the MPLS packets to control unit 26. Control unit 26 routes the MPLS packets to ATM IFC 24, which removes the labels from the MPLS packets to reveal the ATM cells. ATM IFC 24 selectively outputs the ATM cells on virtual circuits 38.

The architecture of router 20 illustrated in FIG. 3 is for exemplary purposes only. The invention is not limited to this architecture. In other embodiments, router 20 may be configured in a variety of ways. In one embodiment, for example, control unit 26 and its corresponding functionality may be replicated and incorporated directly within IFC 22 and ATM IFC 24.

Figure 4:
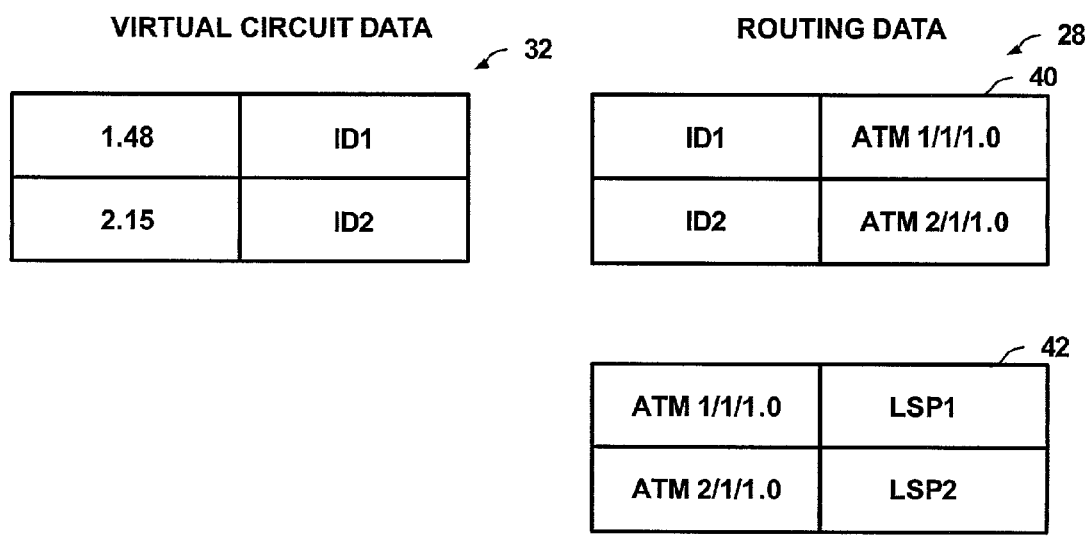
FIG. 4 is a block diagram illustrating example data structures maintained by the router of FIG. 3 to map virtual circuits to label switch paths within the IP network.

FIG. 4 is a block diagram illustrating example data structures maintained by router 20 of FIG. 3 to map virtual circuits 38 to label switch paths within the IP network. In the illustrated embodiment, VC data 32 is arranged as a table that maps virtual circuits 38 to unique identifiers. VC data 32 may map, for example, a first virtual circuit 1.48 to an identifier ID1, and a second virtual circuit 2.15 to an identifier ID2.

Routing data 28 is arranged to include tables 40, 42. Table 40 maps the unique identifiers to ATM channels that have been allocated by control unit 26. Table 40, for example, maps ID1 to channel ATM 1/1/1.0, and ID2 to channel ATM 2/1/1.0. Table 42 maintains routing entries that map channels to label switch paths of the IP network. Table 42, for example, maps channel ATM 1/1/1.0 to LSP1, and channel ATM 2/1/1.0 to LSP2. In this manner, control unit 26 generates VC data 32 and routing data 28 to map virtual circuits of an ATM network to label switch paths of an IP network.

The data structures of in FIG. 4 are illustrated for exemplary purposes only, and may be arranged in any number of forms, and may store a wide variety of additional data. For example, routing data 28 and VC data 32 may be arranged as radix trees, link lists, and other data structures. Routing data 28 may include additional routing entries to reflect the topology of the IP network, as well as next hop data describing neighboring devices of router 20 along routes within the IP network. Router 20 may store the data structures for access by control unit 26 within a variety of types of computer-readable media, such as non-volatile random access memory (NVRAM), read-only memory (ROM), dynamic random access memory (DRAM), FLASH memory, magnetic media, optical media, and the like.

Figure 5:
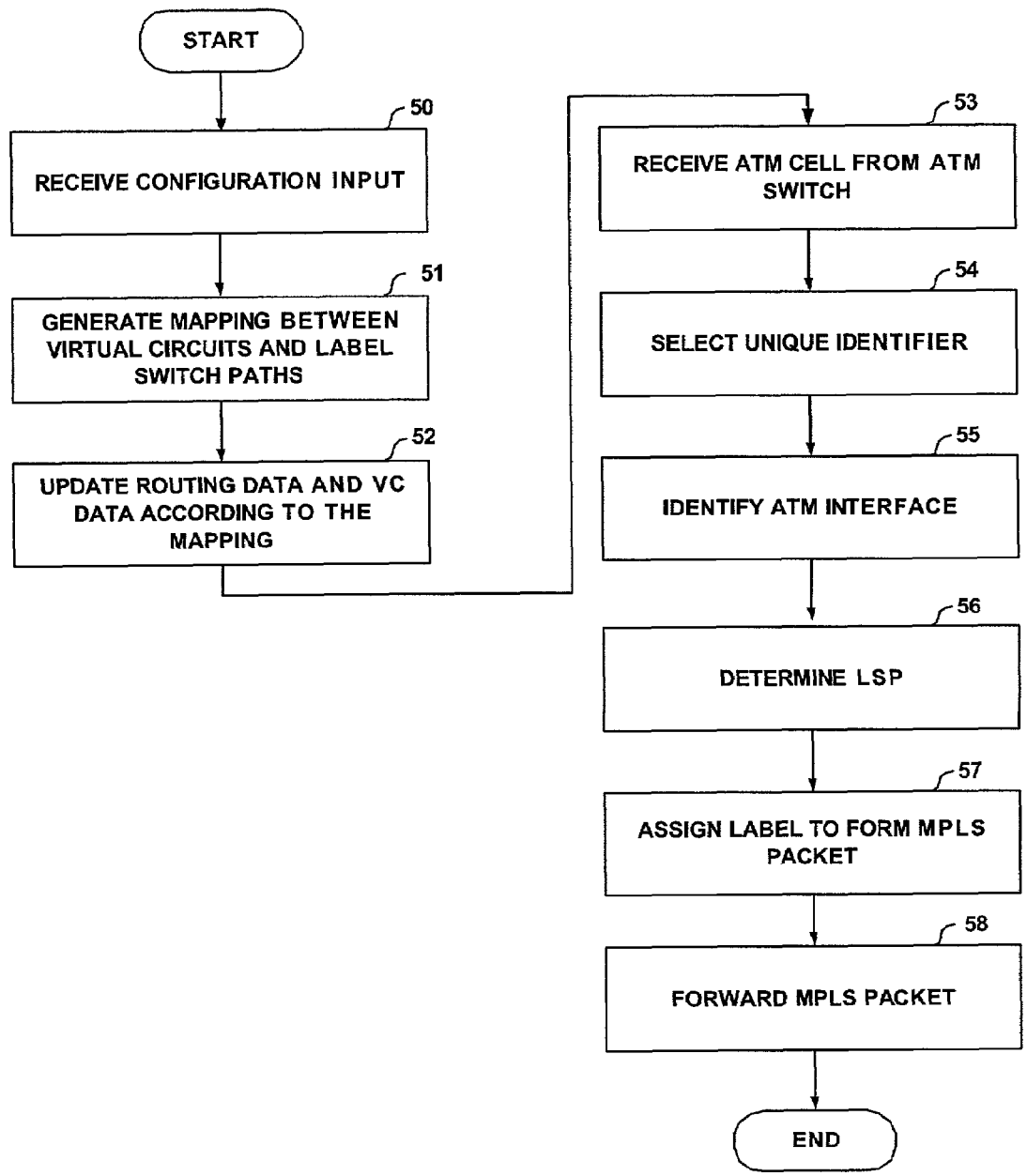
FIG. 5 is a flowchart further illustrating an example mode of operation of the router when receiving ATM cells from an ATM network.

FIG. 5 is a flowchart further illustrating an example mode of operation of router 20 (FIG. 2) when receiving ATM cells from an ATM network. Initially, control unit 26 receives configuration input from a user, such as a system administrator, that configures ATM IFC 24 (50). For example, the system administrator may define one or more ATM interfaces having one or more virtual circuits.

Based on the configuration information, control unit 26 generates a mapping between the specified virtual circuits and one or more respective label switch paths (51). Control unit 26 updates routing data 28 and VC data 32 to reflect the mapping (52).

After configuration, ATM IFC 24 receives an inbound cell from an ATM switch via virtual circuits 38 (53), and selectively retrieves a unique identifier from VC data 32 based on the virtual circuit from which the cell arrived (54). Control unit 26 receives the cell and the respective unique identifier, and determines the ATM interface on which the cell arrived based on the unique identifier (55).

Next, control unit 26 determines a corresponding LSP associated with the identified ATM interface based on routing data 28 (56). Control unit 26 assigns the inbound cell an appropriate MPLS label for the selected LSP, and forms an outbound MPLS packet by pre-pending the MPLS label to the ATM cell (57).

In accordance with routing data 28, control unit 26 forwards the MPLS packets on the IP network via network link 25 (58). In this manner, router 20 relays inbound cells received from an ATM network through an IP network without regard to the content of the ATM cells. In other words, the devices within the IP network, need not analyze the headers of the ATM cells. In this sense, the ATM cells are "opaque" to the IP network, and can be easily routed within the network. Accordingly, router 20 can readily relay data as well as ATM control information through the IP network in the form of MPLS packets.

Figure 6:
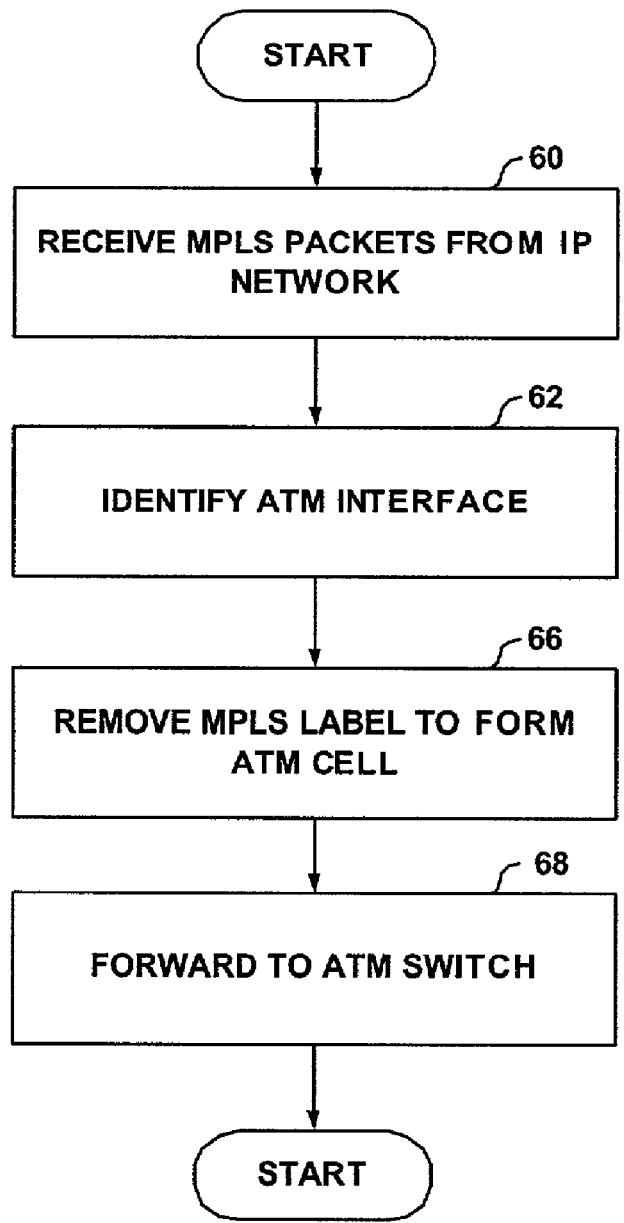
FIG. 6 is a flowchart further illustrating an example mode of operation of the router when receiving Multi-protocol Label Switching (MPLS) packets from the IP network that encapsulate ATM cells destined for the ATM network.

FIG. 6 is a flowchart further illustrating an example mode of operation of router 20 when receiving MPLS packets from the IP network that encapsulate ATM cells destined for the ATM network. Upon receiving an MPLS packet from the IP network via network link 23, IFC 22 communicates the MPLS packet to control unit 26 (60). Control unit 26 analyzes the MPLS packet to determine a destination interface based on the LSP from which the MPLS packet arrived (62). Control unit 26 removes the labels from the MPLS packets to extract the ATM cells, and forwards the cells to the ATM IFC 24(66). ATM IFC 24 forwards the ATM cells to the ATM network via virtual circuits 38 (68).

Figure 7:
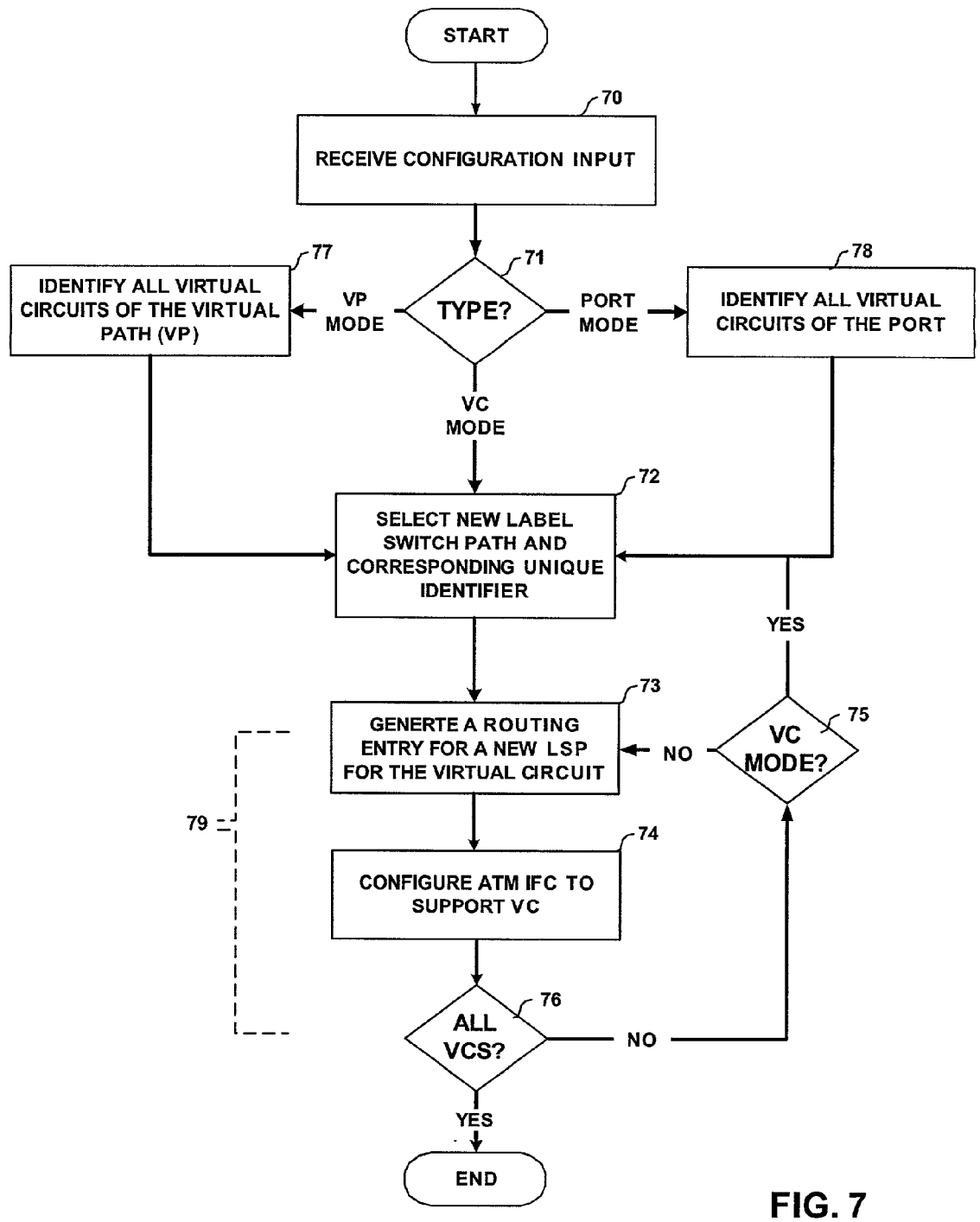
FIG. 7 is a flowchart illustrating the process of configuring the router to relay cells between one or more virtual circuits and an IP network.

FIG. 7 is a flowchart further illustrating the process of configuring router 20 to relay cells between one or more virtual circuits and an IP network. Initially, control unit 26 receives the configuration input from a user, such as a system administrator (70). For example, router 20 may include a command line interface to receive text-based configuration input from the user, either directly or via remote access.

In one embodiment, router 20 supports three different modes for configuring the relaying of ATM cells. In particular, the three modes can be use to configure router 20 to support: (a) a set of one or more independent virtual circuits that are mapped to a set of corresponding label switch paths, (b) a virtual path comprising a set of related virtual circuits that are mapped to a single label switch path, and (c) an ATM port in which all virtual circuits are mapped to a single label switch path.

Upon receiving the input, router 20 determines the configuration mode specified by the input (71). The following pseudocode illustrates example configuration input of the first mode (VC MODE) in which ATM IFC 24 is configured to support a two independent virtual circuits using a two corresponding label switch paths:

```
INTERFACES {
    1/1/0 {
        ATM-OPTIONS {
            VPI   1   512;
            VPI   2   256;
        }
        UNIT 0    {
            ENCAPSULATION ATM_CELL_RELAY;
            VCI   1.21;
        }
        UNIT 1    {
            ENCAPSULATION ATM_CELL_RELAY;
            VCI   2.54;
        }
    }
}
```

In the above-listed configuration input, the user specifies two ATM virtual path interfaces (VPI 1, VPI 2) that may comprise a maximum of 512 and 256 virtual circuits, respectively. In addition, the configuration input opens two independent virtual circuit interfaces (VCI 1.21, VCI 2.54) to perform ATM cell relay for two virtual circuits.

When processing the configuration input, control unit 26 first selects a new label switch path to relay cells of the first virtual circuit, as well as a unique identifier for the new label switch path (72). Next, control unit 26 generates an entry within routing data 28 to map an interface, such as ATM 1/1/1.0, to the new label switch path (73). Control unit 26 then configures ATM IFC 24 to support the new virtual circuit, including updating VC data 32 to map the specified virtual circuit to the selected unique identifier associated with the newly created label switch path (74).

Control unit 26 repeats the process until all of the virtual circuits specified within the input have been processed (76). Specifically, for this configuration mode (VC MODE), control unit 26 associates a new label switch path for each specified virtual circuit (75, 72). In this manner, each specified virtual circuit is mapped to a unique label switch path.

The following pseudocode illustrates example configuration input of the second mode (VP MODE) in which ATM IFC 24 is configured to support a virtual path comprising a set of related virtual circuits using a single label switch path:

```
INTERFACES {
    1/1/0 {
        ATM-OPTIONS {
            VPI   1    512;
            VPI   2    256;
        }
        UNIT 0    {
            ENCAPSULATION ATM_CELL_RELAY;
            VPI   1;
        }
        UNIT 1    {
            ENCAPSULATION ATM_CELL_RELAY;
            VPI   2;
        }
    }
}
```

In the above-listed configuration input, the user specifies an ATM virtual path interface (VPI 1) that may comprise a maximum of 512 virtual circuits, and a second ATM virtual path interface (VPI 2) that may comprise a maximum of 256 virtual circuits. Next, the configuration input specifies a first interface (UNIT 0) and a second interface (UNIT 1) to perform ATM cell relay for the virtual paths.

In this mode (VP MODE), control unit 26 first identifies all virtual circuits of the virtual path (77). Next, control unit 26 selects a label switch path to relay cells of the virtual circuits, and repeats loop 79 until all of the virtual circuits have been mapped to a common label switch path (76, 75). In other words, VC data 32 maps each of the virtual circuits of the path to a common unique identifier, which routing data 28 maps to a common label switch path. Control unit 26 repeats loop 79 until the label switch path has been assigned for each virtual circuit of the virtual path (76).

The above modes, although illustrated separately, may be readily combined to configure ATM IFC 24. An ATM interface may be specified, for example, to have a mixture of virtual paths and independent virtual circuits.

The following pseudocode illustrates example configuration input of the third mode (VP MODE) in which ATM IFC 24 is configured to support an ATM port in which all virtual circuits are mapped to a single label switch path:

```
INTERFACES {
    1/1/0 {
        ATM-OPTIONS {
            VPI   1    512;
            VPI   2    256;
        }
        UNIT 0    {
            ENCAPSULATION ATM_CELL_RELAY;
            ALLOW_ANY_VCI;
        }
    }
}
```

In the above-listed configuration input, the user specifies an ATM virtual path interface (VPI 1) that may comprise a maximum of 512 of virtual circuits, and a second ATM virtual path interface (VPI 2) that may comprise a maximum of 256 virtual circuits. Next, the configuration input specifies a first interface (UNIT 0) to perform ATM cell relay for all of the virtual circuits of the virtual paths.

In this mode (VP MODE), control unit 26 first identifies all virtual circuits of the port (78). Next, control unit 26 selects a label switch path to relay cells of the virtual circuits, and repeats loop 79 until all of the virtual circuits of the port have been mapped to a common label switch path (76, 75). In other words, VC data 32 maps each of the virtual circuits of the port to a common unique identifier, which routing data 28 maps to a common label switch path.

FIG. 8 illustrates an example embodiment in which control unit 26 has generated VC data 32 in response to configuration input specifying a combination of an independent virtual circuit and a virtual path. In this example, control unit 26 has mapped independent virtual circuit 1.48 to unique identifier ID, and virtual circuits 2.15, 2.16 and 2.17 to a common unique identifier ID2.

FIG. 9 illustrates an example embodiment in which control unit 26 has generated VC data 32 in response to configuration input specifying that all virtual circuits of a port be mapped to a common identifier. In this example, control unit has mapped virtual circuits 1.1-1.511 and 2.1-2.255 to a common identifier.

Figure 10:
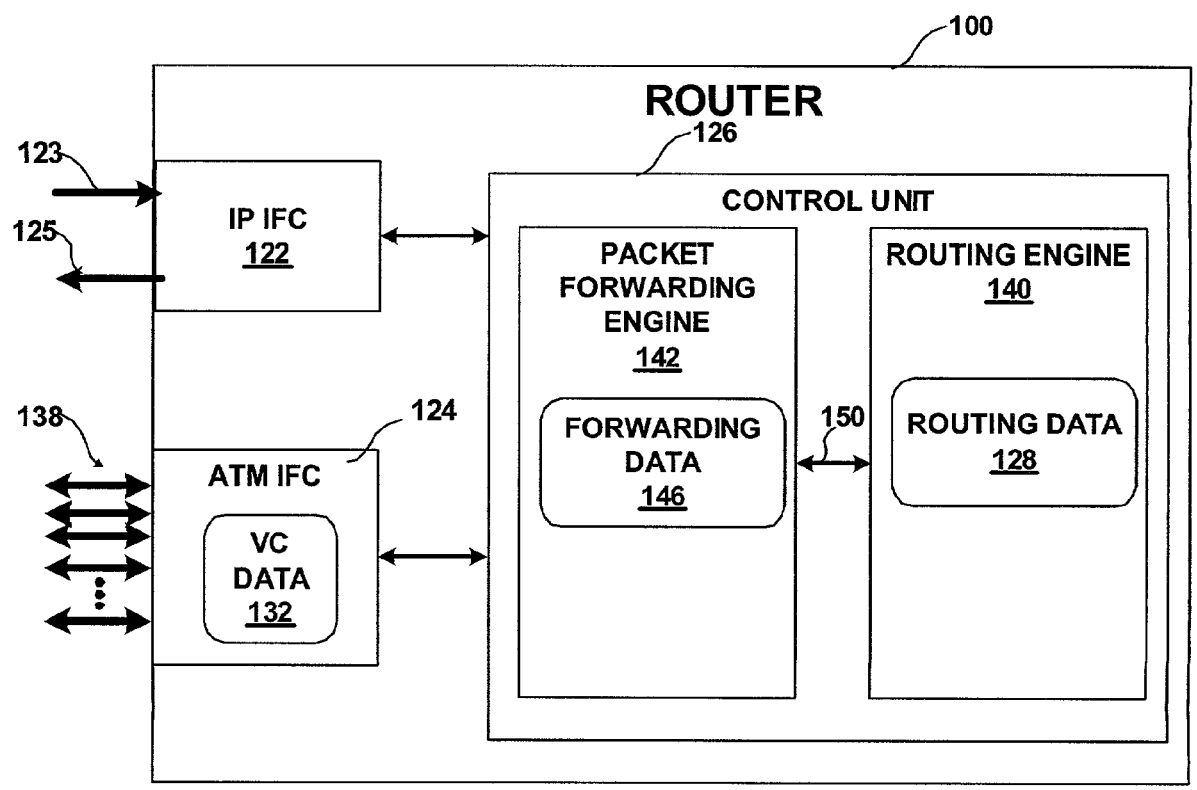
FIG. 10 is a block diagram illustrating another example router that relays ATM cells through an IP network consistent with the principles of the invention.

FIG. 10 is a block diagram illustrating another example router 100 that relays ATM cells through an IP network consistent with the principles of the invention. Router 100 includes control unit 126 that relays MPLS packets and ATM cells between IP IFC 122 and ATM IFC 124. In particular, the functionality of control unit 126 is divided between a routing engine 140 and a packet-forwarding engine 142.

In this configuration, routing engine 140 is primarily responsible for maintaining routing data 128 to reflect the current topology of the IP network. In particular, routing engine 140 periodically updates routing data 128 to accurately reflect the network topology.

In accordance with routing data 128, packet-forwarding engine 142 maintains forwarding data 146 that associates network destinations with specific next hops and corresponding interface ports of IP IFC 122. Forwarding data 146 may, therefore, be thought of as a subset of the information contained within routing data 128. In this manner, forwarding data 146 may map label switch paths within the IP network to particular interface ports of IP IFC 122. Accordingly, as described in detail, packet-forwarding engine 142 relays ATM cells received from virtual circuits 138 to outbound link 125 as MPLS packets for forwarding along one or more LSPs. Similarly, packet-forwarding engine 142 relays MPLS packets received from inbound link 123 to virtual circuits 138 as ATM cells.

In one embodiment, each of packet-forwarding engine 142 and routing engine 140 may comprise one or more dedicated processors, hardware, and the like, and may be communicatively coupled by a data communication channel 150. Data communication channel 150 may be a high-speed network connection, bus, shared-memory or other data communication mechanism. Packet-forwarding engine 142, routing engine 140, or both, may make use of the data structures and organization described above.

Various embodiments of the invention have been described. These and other embodiments are within the scope of the following claims.

The invention claimed is:

1. A method comprising:

establishing Labeled Switch Paths (LSPs) through an Internet Protocol (IP) network from a router included in the IP network;

after establishing the LSPs, receiving with the router asynchronous transfer mode (ATM) cells of a fixed length from one or more virtual circuits of an ATM network;

without disassembling or reassembling information carried by the ATM cells with information carried by other ATM cells, assigning labels to the ATM cells to form Multiprotocol Isabel Switching (MPLS) packets, wherein the labels map the one or more virtual circuits to the LSPs of the IP network; and routing the MPLS packets through the LSPs in accordance with the labels to transport the ATM cells through the IP network.

2. The method of claim 1, wherein assigning labels further comprises assigning the labels to the ATM cells based on the virtual circuits from which each of the ATM cells was received.

3. The method of claim 1, further comprising:

receiving input configuring an interface card of the router included in the IP network to receive the ATM cells from one or more virtual circuits of the ATM network; and assigning the labels to the ATM cells based on the virtual circuits from which each of the ATM cells were received.

4. The method of claim 3, further comprising:

generating data that maps the labels to the virtual circuits in accordance with the input; and storing at least a portion of the data within the interface card.

5. The method of claim 1, further comprising:

receiving input configuring an interface card of the router to receive the ATM cells from a virtual path having a plurality of virtual circuits of the ATM network; and assigning a common one of the labels to the ATM cells received from the virtual circuits of the virtual path.

6. The method of claim 1, further comprising:

receiving input configuring a port of an interface card of the router included in the IP network to receive the ATM cells from a set of virtual circuits of the ATM network; and assigning a common one of the labels to the ATM cells received from each of the virtual circuits received by the port.

7. A method comprising:

receiving, with a router of an Internet Protocol (IP) network, Multiprotocol Label Switching (MPLS) packets from previously established Labeled Switch Paths (LSPs) of the IP network;

removing labels of the packets with the router to extract asynchronous transfer mode (ATM) cells of a fixed length without reassembling information carried by the ATM cells with information carried by other ATM cells, wherein the labels map the LSPs to one or more virtual circuits of an ATM network; and forwarding the ATM cells to an ATM switch included in the ATM network via one or more virtual circuits in accordance with the removed labels.

8. A method comprising:

establishing one or more Labeled Switch Paths (LSPs) through an Internet Protocol (IP) network using a router of the IP network as an ingress router for the one or more LSPs;

after establishing the LSPs, generating mapping data that maps virtual circuits of an asynchronous transfer mode (ATM) network to one or more labels for the LSPs of the IP network;

after generating the mapping data, receiving an ATM cell from one of the virtual circuits with the router included in the IP network;

identifying the virtual circuit from which the ATM cell was received;

selecting one of the labels for the ATM cell based on the mapping data and the identified virtual circuit;

assigning the selected label to the ATM cell to form a Multiprotocol Label Switching (MPLS) packet without reassembling information carried by the ATM cell with information carried by other ATM cells; and routing the MPLS packet through the LSPs in accordance with the label to transport the ATM cell through the IP network.

9. The method of claim 8, further comprising:

receiving input configuring an interface card of the router included in the IP network to receive the virtual circuits; and generating the mapping data in accordance with the input.

10. The method of claim 8, wherein generating mapping data comprises generating mapping data that maps a plurality of the virtual circuits to a common one of the labels.

11. The method of claim 8, further comprising storing at least a portion of the mapping data within an interface card of the router included in the IP network.

12. The method of claim 8, wherein generating mapping data comprises:

generating virtual circuit (VC) data that maps the virtual circuits to unique identifiers;

generating channel data that maps the unique identifiers to channels; and generating routing data that maps the channels to the Labeled Switch Paths (LSPs).

13. The method of claim 12, further comprising generating forwarding data in accordance with the routing data.

14. The method of claim 13, further comprising:

storing the VC data within an interface card of the router included in the IP network; and storing the channel data and the forwarding data within a packet-forwarding engine of the router.

15. The method of claim 14, further comprising:

receiving the ATM cell with the interface card from one of the virtual circuits;

associating the ATM cell with one of the unique identifiers in accordance with the VC data;

forwarding the ATM cell from the interface card to the packet-forwarding engine;

selecting one of the channels from the channel data based on the associated unique identifiers of the cell; and forwarding the ATM cell via one of the LSPs in accordance with the forwarding data and the selected channel.

16. An apparatus comprising:

a control unit to establish Label Switch Paths (LSPs) through an Internet Protocol (IP) network; and an interface card to receive asynchronous transfer mode (ATM) cells of a fixed length from one or more virtual circuits of an ATM network after the LSPs are established, wherein, without disassembling or reassembling information carried by the ATM cells with information carried by other ATM cells, the control unit assigns labels to the ATM cells to form Multiprotocol Label Switching (MPLS) packets, wherein the labels map the one or more virtual circuits to the LSPs of the IP network, and wherein the control unit routes the MPLS packets through the LSPs in accordance with the labels to transport the ATM cells through the IP network.

17. The apparatus of claim 16, further comprising an interface module to receive input configuring the interface card to receive the ATM cells from one or more virtual circuits of the ATM network, wherein the control unit assigns the labels to the ATM cells based on the virtual circuits from which each of the cells were received.

18. The apparatus of claim 17, wherein the control unit assigns a common one of the labels to the ATM cells received from a subset of the virtual circuits when the input defines a virtual path containing the subset of the virtual circuits.

19. The apparatus of claim 17, wherein the control unit assigns a common one of the labels to the ATM cells received from the virtual circuits received via a port of the interface card.

20. The apparatus of claim 17, further comprising a computer-readable medium to store data generated by the control unit that maps the labels to the virtual circuits in accordance with the input.

21. An apparatus comprising:
a first interface card for coupling to an asynchronous transfer mode (ATM) network;
a second interface card for coupling to an Internet Protocol (IP) network; and
a control unit to assign labels to inbound ATM cells from the ATM network without disassembling or reassembling information carried by the ATM cells with information carried by other ATM cells to form outbound Multiprotocol Label Switching (MPLS) packets for forwarding through the TP network, and to remove labels from inbound MPLS packets from the IP network to form outbound ATM cells for forwarding through the ATM network.

22. The apparatus of claim 21, further comprising a computer-readable medium to:
receive input configuring the first interface card to receive the ATM cells from one or more virtual circuits of the ATM network; and
store data generated by the control unit that maps the labels to the virtual circuits in accordance with the input.

23. The apparatus of claim 21, further comprising:
a routing engine to maintain routing data based on a topology of the IP network; and
a forwarding engine to maintain forwarding data in accordance with the routing data, wherein the first interface card stores data that maps virtual circuits of the ATM network to unique identifiers, and the forwarding engine stores data that maps the unique identifiers to the labels.

24. A routing device comprising:
a control unit to establish Label Switch Paths (LSPs) through an Internet Protocol (IP) network;

computer-readable media to store data that maps virtual circuits of an ATM network to the LSPs of the IP network, wherein the data comprises virtual circuit (VC) data that maps the virtual circuits to unique identifiers, and routing data that maps the unique identifiers to the LSPs; and wherein the control unit, without disassembling or reassembling information carried by the ATM cells with information carried by other ATM cells, assigns labels associated with the data stored by the computer-readable media to inbound ATM cells from the ATM network to form outbound Multiprotocol Label Switching (MPLS) packets for forwarding through the IP network.

25. A computer-readable medium comprising encoded with computer-executable instructions that cause a computer processor executing the instructions to:
establish Labeled Switch Paths (LSPs) through an Internet Protocol (IP) network from a router included in the IP network;
after establishing the LSPs, receive asynchronous transfer mode (ATM) cells from one or more virtual circuits of an ATM network with the router included in the IP network;
without disassembling or reassembling information carried by the ATM cells with information carried by other ATM cells, assign labels to the ATM cells to form Multiprotocol Label Switching (MPLS) packets, wherein the labels map the one or more virtual circuits to the LSPs of the IP network; and
route the MPLS packets through the LSPs in accordance with the labels to transport the ATM cells through the IP network.

26. The computer-readable medium of claim 25, wherein the instructions cause the processor to assign the labels to the ATM cells based on the virtual circuits from which each of the ATM cells was received.

27. The computer-readable medium of claim 25, wherein the instructions cause the processor to:
receive input configuring an interface card of the router to receive the ATM cells from one or more virtual circuits of the ATM network; and
assign the labels to the ATM cells based on the virtual circuits from which each of the cells were received.

28. The computer-readable medium of claim 27, wherein the instructions cause the processor to:
generate data that maps the labels to the virtual circuits in accordance with the input; and
store at least a portion of the data within the interface card.

29. The computer-readable medium of claim 25, wherein the instructions cause the processor to:
receive input configuring an interface card of the router included in the IP network to receive the ATM cells from a virtual path having a plurality of virtual circuits of the ATM network; and
assign a common one of the labels to the ATM cells received from the virtual circuits of the virtual path.

30. The computer-readable medium of claim 25, wherein the instructions cause the processor to:
receive input configuring a port of an interface card of the router included in the IP network to receive the ATM cells from a set of virtual circuits of the ATM network; and
assign a common one of the labels to the ATM cells received from each of the virtual circuits received by the port.

31. A system comprising:
a first asynchronous transfer mode (ATM) network including one or more virtual circuits;
a second ATM network including one or more virtual circuits; and
an Internet Protocol (IP) network including a first router, a second router, and one or more label switched paths (LSPs) established between the first router and the second router,
wherein, after establishing the LSPs, the first router receives ATM cells of a fixed length from the one or more virtual circuits of the first ATM network, assigns labels to the ATM cells without disassembling or reassembling information carried by the ATM cells with information carried by other ATM cells to form Multiprotocol Label Switching (MPLS) packets, and routes the MPLS packets through the LSPs in accordance with the labels to transport the ATM cells through the IP network to the second router, and
wherein the second router receives the MPLS packets from the one or mote LSPs of the IP network, removes the labels of the packets to extract ATM cells of a fixed length without disassembling or reassembling information carried by the ATM cells with information carried by other ATM cells, and forwards the ATM cells to the second ATM network via the one or more virtual circuits of the second ATM network in accordance with the removed labels.

32. The system of claim 31, wherein each of the MPLS packets includes one of the ATM cells.

33. The method of claim 1, wherein each of the MPLS packets includes one of the ATM cells.

34. The method of claim 7, wherein each of the MPLS packets includes one of the ATM cells.

35. The method of claim 8, wherein the MPLS packet includes a single ATM cell.

36. The apparatus of claim 16, wherein each of the MPLS packets includes one of the ATM cells.

37. The apparatus of claim 21, wherein each of the MPLS packets includes one of the ATM cells.

38. The routing device of claim 24, wherein each of the MPLS packets includes one of the ATM cells.

39. The computer-readable medium of claim 25, wherein each of the MPLS packets includes one of the ATM cells.

* * * * *